United States Patent [19]

Okabayashi et al.

[11] Patent Number: 4,622,505
[45] Date of Patent: Nov. 11, 1986

[54] DEVICE FOR CONTROLLING ROTATION OF STEPPING MOTOR

[75] Inventors: Mitumasa Okabayashi; Norio Shiga, both of Tokyo, Japan

[73] Assignee: Tokyo Juki Industrial Co., LTD, Tokyo, Japan

[21] Appl. No.: 600,003

[22] Filed: Apr. 13, 1984

[30] Foreign Application Priority Data

Apr. 19, 1983 [JP] Japan ................... 58-68640

[51] Int. Cl.⁴ ............................................. H02P 8/00
[52] U.S. Cl. ..................................... 318/696; 318/685
[58] Field of Search ........................ 318/685, 696, 561

[56] References Cited

U.S. PATENT DOCUMENTS 4,025,837 5/1977 Meier et al. ..................... 318/561
4,377,847 3/1983 Daniel et al. ..................... 364/400

Primary Examiner—William M. Shoop, Jr.
Assistant Examiner—Saul M. Bergmann
Attorney, Agent, or Firm—Yount & Tarolli

[57] ABSTRACT

This invention relates to a device for controlling the rotation of the stepping motor in a printer. The device comprises a U-shaped frame member fixedly secured to the carriage of the printer and having opposing light emitting and receiving elements formed by the opposing legs of the frame member and a detector fitted on the drive shaft of the stepping motor for rotation with the drive shaft so as to intervene between the light emitting and receiving elements to interrupt the passage of the light from the light emitting element to the light receiving element to thereby turn the light receiving element OFF and also clear the light emitting and receiving elements to allow the light to pass from the light emitting element to the light receiving element so as to turn the light receiving element ON as the detector rotates.

3 Claims, 12 Drawing Figures

| Step angle | a | b | c | d | e | f |
|---|---|---|---|---|---|---|
| Exciting phase | $\varphi_1$ | $\varphi_2$ | $\varphi_3$ | $\varphi_4$ | $\varphi_1$ | $\varphi_2$ |

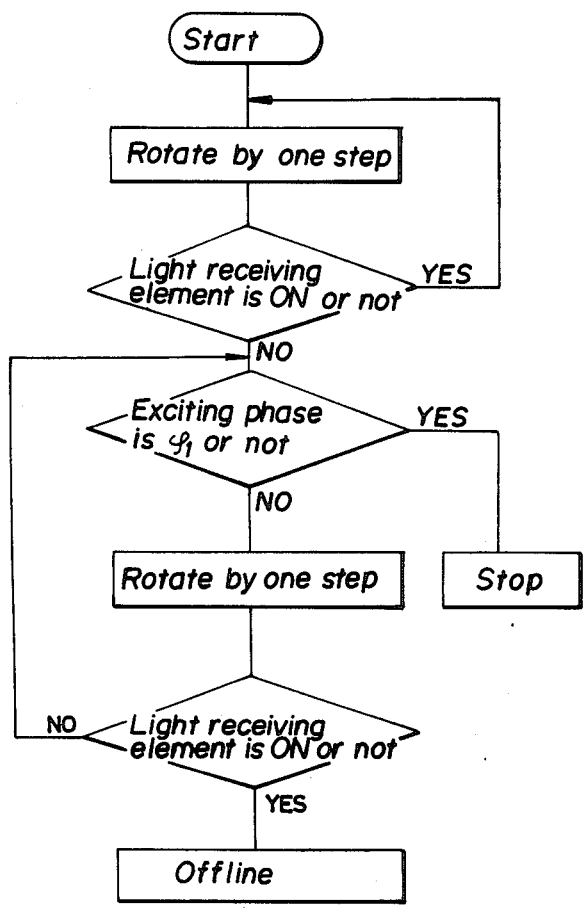

DEVICE FOR CONTROLLING ROTATION OF STEPPING MOTOR

BACKGROUND OF THE INVENTION

This invention relates to a device for controlling the rotation of the stepping motor in a printer so as to stop the rotation of the stepping motor at a particular rotation angle.

Heretofore, in a matrix printing type serial printer as shown, for example, in FIG. 1, a printing type wheel 2 is mounted on the drive shaft 1 of the stepping motor M and the stepping motor M is driven to select a desired printing type to be used for a particular printing operation. However, in such a serial printer, in order to eliminate error in the printing type selection which may be caused by any improper stepping of the stepping motor, a particular rotation angle of the motor drive shaft 1 is detected as the reference rotation angle and the drive shaft 1 is returned to the particular or reference rotation angle in the manner hereafter described immediately after one printing operation has been completed.

That is, a detector 3 in the form of a bar is fixedly fitted on the drive shaft 1 of the stepping motor M and a U-shaped frame member 4 is fixedly secured to the carriage (not shown) on which the stepping motor M is mounted in such a position that the opposing legs of the frame member or the light emitting element L and light receiving element F surround a section of the rotational movement path of the detector 3 whereby the light emitted from the light emitting element L normally maintains in the ON position the light receiving element F and when the detector 3 intervenes between the light emitting and receiving elements L and F as the detector 3 rotates in its rotational movement path, the light receiving element F is turned OFF.

For returning the motor drive shaft 1 to the above-mentioned particular or reference rotation angle after one printing operation has been completed, first of all, the drive shaft 1 is rotated in one direction (as shown by the arrow in FIG. 2A) to thus cause the detector 3 to intervene between the light emitting and receiving elements L and F thereby turning the light receiving element F OFF (FIG. 2), which in turn stops the rotation of the stepping motor M and accordingly, of the drive shaft 1 thereof.

However, in such an arrangement of the serial printer, when the detector 3 is mounted on the motor drive shaft 1 in a position slightly deviating from the reference position in the clockwise or counter-clockwise direction, the time point at which the detector 3 passes over the reference rotation angle does not coincide with the time point at which the detector 3 intervenes between the light emitting and receiving elements L and F to interrupt the passage of the light emitted from the element L to the element F and thus there is the drawback that the drive shaft 1 of the stepping motor M tends to cease rotation at a rotation angle which deviates from the particular or reference rotation angle by one or two steps. In order to eliminate this drawback, it is necessary that the position of the detector 3 is finely adjusted by a tedious procedure.

SUMMARY OF THE INVENTION

Therefore, the present invention is to provide a device for controlling the rotation of the stepping motor in a printer which can positively stop the rotation of the drive shaft of the stepping motor at a particular rotation angle without requiring any highly accurate positioning of the detector.

The above and other objects and attendant advantages of the present invention will be more readily apparent to those skilled in the art from a reading of the following detailed description in conjunction with the accompanying drawings which show one preferred embodiment of the invention for illustration purpose only, but not for limiting the scope of the same in any way.

BRIEF DESCRIPTION OF THE DRAWINGS

FIG. 6 is a flow chart showing controlling conditions.

PREFERRED EMBODIMENT OF THE INVENTION

Figure 1:
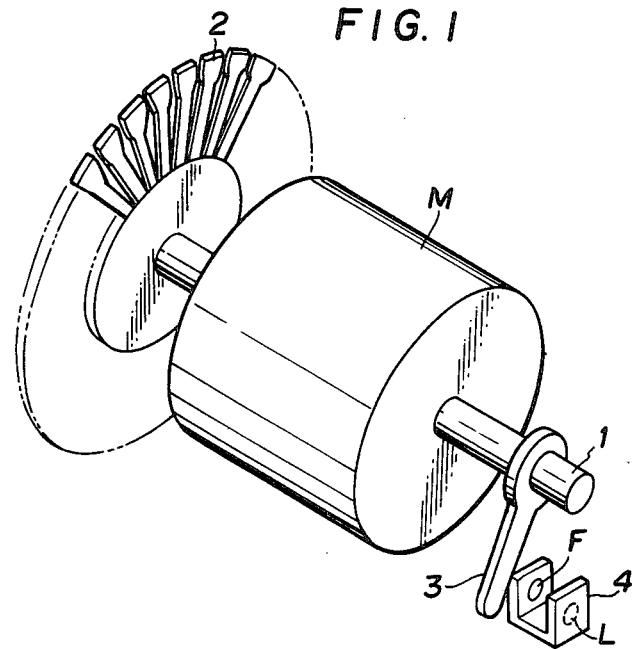
FIG. 1 is a perspective view of a stepping motor having a printing type wheel mounted thereon and a prior art detection means attached thereto.
Figure 2A:
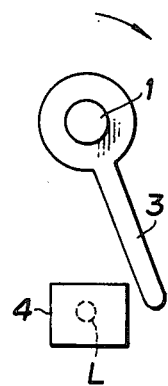
FIGS. 2a and 2b are views showing said detection means in different detection positions.
Figure 2B:
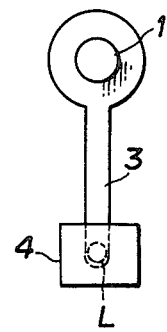

The present invention will be now described by way of one preferred embodiment referring to the accompanying drawings and, more particularly, to FIGS. 3(a)–3(f) thereof, in which the corresponding components have been assigned the identical numerals with those employed for the components of the prior art control device shown in FIGS. 1 and 2. The stepping motor with which the control device of the invention is employed has four exciting phases ($\phi_1$–$\phi_4$). In FIG. 3, reference numeral 5 denotes a detector fixedly fitted on the drive shaft 1 of the stepping motor (not shown) for rotation therewith and having a shank of sufficient width in the rotational direction of the motor drive shaft 1 to intervene between the light emitting and receiving elements L and F at step angles d and f with the reference or particular angle e (corresponding to $\phi_1$ exciting phase) interposed therebetween or in $\phi_4$, $\phi_1$ and $\phi_2$ exciting phases. However, the shank of the detector 5 may have a width sufficient to intervene between the light emitting and receiving elements L and F within the exciting phase range $\phi_1$–$\phi_4$ or the step angle range a–d without departing from the scope of the invention.

Figures 4, 5:
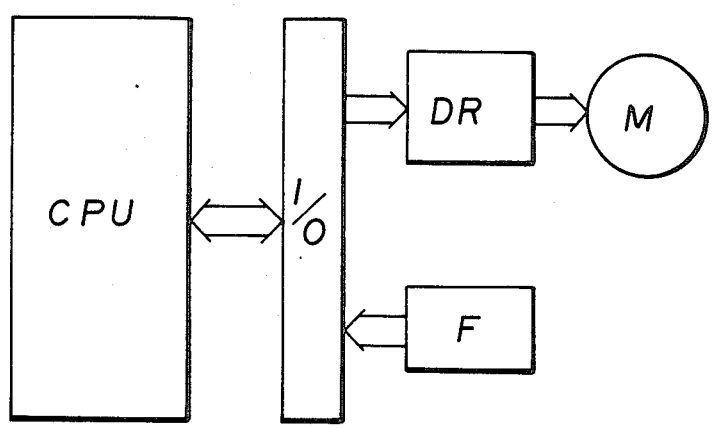
FIG. 4 is a block diagram of the control circuit of the control device for a stepping motor according to the present invention.
FIG. 5 is a view showing correspondence of step angles (a)–(f) to exciting phases.

FIG. 4 is a block diagram of the control circuit for the control device of the invention. In FIG. 4, CPU denotes a central processing unit, I/0 denotes an input and output port, DR denotes the drive circuit of the stepping motor M and F denotes the above-mentioned light receiving element.

The respective correspondence of the step angles a–f to the exciting phases $\phi_1$–$\phi_4$ is shown in FIG. 5.

FIG. 6 is a flow chart of CPU for setting the motor drive shaft 1 at the reference or particular step angle $\phi_1$ and, first of all, the drive shaft 1 of the stepping motor M is rotated step by step in the clockwise direction (FIG. 3). Next, it is determined whether the light receiving element F is ON or not. If the light receiving element F is On, the motor drive shaft 1 continues to rotate. On the other hand, if the light receiving element F is OFF, it is determined whether the stepping motor has reached $\phi_1$ exciting phase corresponding to the reference step angle e (FIG. 3) or not. If the stepping motor M is in $\phi_1$ phase, the motor immediately ceases rotation. If the motor M is not in $\phi_1$ phase, it is again determined whether the light receiving element F is ON or not. If the light receiving element F is OFF, it is again determined whether the stepping motor M is in $\phi_1$ phase or not, but if the light receiving element F is ON, this is deemed as error and CPU is turned off-line.

With the above-mentioned construction and arrangement of the components of the control device of the invention, the operation of the control device will be now described.

First of all, in the printing position of the printer, the stepping motor M is driven by the number of steps corresponding to a printing command to rotate the printing type wheel 2 for selection of a proper printing type for performing a particular printing operation.

Figure 3A:
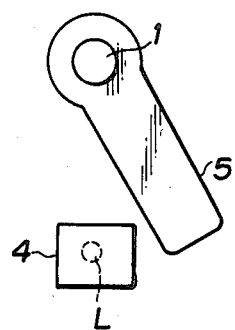
FIGS. 3(a)–3(f) are views showing the detection means of the invention in different detection positions.
Figure 3B:
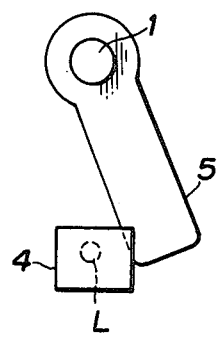
Figure 3C:
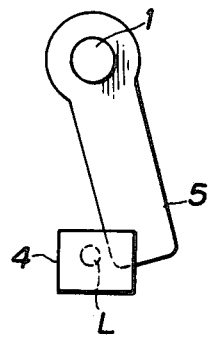
Figure 3D:
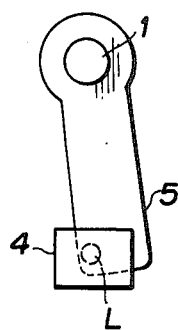
Figure 3E:
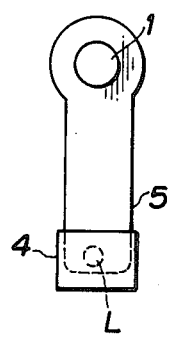
Figure 3F:
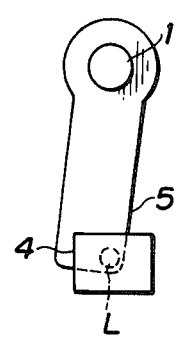

When the printing operation has been completed, CPU enters the flow chart of FIG. 6. That is, when the detector 5 is at the step angle as shown in FIG. 3(a), the exciting phase is $\phi_1$ phase corresponding to the reference step angle e, but since the detector 5 does not intervene between the light emitting and receiving elements L and F in this exciting phase, the light receiving element F remains ON and thus, the detector 5 is rotated by one step in the clockwise direction and the stepping motor M is in $\phi_2$ phase or at step angle B. Also at this step angle c of the stepping motor M, since the light receiving element F still remains ON, the detector 5 is further rotated by one step from step angle c to step angle d and the stepping motor M passes from $\phi_3$ phase to $\phi_4$ phase whereupon the detector 5 intervenes between the light emitting and receiving elements L and F to turn the light receiving element F OFF and it is determined whether the exciting phase is $\phi_1$ or not. However, since the stepping motor M is now in $\phi_4$ phase, the detector 5 is further rotated from step angle d by one step in the clockwise direction (FIG. 3) to assume step angle e or $\phi_1$ phase whereupon the stepping motor M ceases to rotate thereby completing the setting of the drive shaft 1 in the reference position.

As mentioned hereinabove, according to the present invention the detection means for detecting the reference angle of the stepping motor drive shaft produces a detection signal over a range including a plurality of step angles, a particular step angle of the plural step angles is selected as the reference t a gle and the rotation of the stepping motor is stopped upon the detection of the reference exciting phase within the detection signal generation range and thus, even if the mounting position of the detector in the detection means deviates somewhat in the clockwise or counter-clockwise direction with respect to the rotational direction of the motor drive shaft, the reference step angle will remain within the detection signal generation range and thus, it is not necessary to finely adjust the mounting position of the detector by any troublesome operation and the drive shaft of the stepping motor can be always accurately returned to the reference step angle after one printing operation has been completed.

In the illustrated embodiment, although the detector 5 is shown as a plate member, a disc having a slit having the width corresponding to that of the detector 5 may be also employed. In such a case, the orders "ON" and "OFF" for determining the condition of the light receiving element F in the flow chart in FIG. 5 may be reversed.

Also the detection means for interrupting the light path in the illustrated embodiment can be replaced by a magnet - magnetic sensor combination without departing from the spirit of the invention.

Additionally the number of exciting phases is not limited to four, and may be more or less than four.

Although the invention has been described with respect to a preferred embodiment, it will be appreciated that various rearrangements and alternations of parts may be made without departing from the spirit and scope of the present invention as defined in the appended claim.

What is claimed is:

1. An apparatus for use in a printer to control the rotation of the drive shaft of a stepping motor having a plurality of exciting phases through which the motor is operated during a cycle of operation, said apparatus comprising:

detection means connected with the drive shaft of the stepping motor and the framework of the printer for detecting a predetermined rotational angle range of said drive shaft corresponding to a plurality of step angles the number of which is less than the number of step angles in one cycle of said motor, means for detecting a particular step angle of said plurality of step angles, and means for stopping the rotation of said stepping motor when the motor is excited in an exciting phase corresponding to said particular step angle.

2. An apparatus for use in a printer having a rotatable print wheel, said apparatus comprising a stepping motor having a rotatable drive shaft connected with the print wheel, said stepping motor being operable through a series of stepping positions to rotate the drive shaft and print wheel from a reference position back to the reference position, said series of stepping positions including a range of stepping positions which is substantially smaller than the series of stepping positions and includes a stepping position corresponding to the reference position and a plurality of stepping positions adjacent to the stepping position corresponding to the reference position, detector means for detecting when the motor has been operated to one of the stepping positions in the range of stepping positions, logic means connected with said detector means for determining whether or not the one stepping position to which the motor has been operated corresponds to the reference position, and motor control means connected with said logic means and said stepping motor for effecting operation of said stepping motor to the next succeeding stepping position in the range of stepping positions in response to said logic means determining that the one stepping position to which said stepping motor has been operated does not correspond to the reference position, said motor control means including means for stopping operation of said stepping motor with the drive shaft and print wheel in the reference position in response to said logic means determining that the stepping position to which said stepping motor has been operated corresponds to the reference position.

3. An apparatus as set forth in claim 2 wherein said detector means includes means for detecting when said stepping motor has been operated from a stepping position in the range of stepping positions to a stepping position outside of the range of stepping positions, said logic means including means for determining when said stepping motor has been operated from a stepping position in the range of stepping positions to a stepping position outside of the range of stepping positions during operation of said stepping motor to move the drive shaft and print wheel to the reference position, said motor control means including means for stopping operation of said stepping motor in a direction away from the range of stepping positions in response to said logic means determining that said stepping motor has been operated from a stepping position in the range of stepping positions to a stepping position outside of the range of stepping positions during operation of said stepping motor to move the drive shaft and print wheel to the reference position.

* * * * *